April 6, 1937.  W. L. O'NEILL  2,076,091

OVEN

Filed March 8, 1935

Inventor:
William L. O'Neill
Charles B. Rasmussen
Atty.

Patented Apr. 6, 1937

2,076,091

UNITED STATES PATENT OFFICE 2,076,091

OVEN

William L. O'Neill, Chicago, Ill., assignor, by mesne assignments, to Angus Roy Shannon, Chicago, Ill.

Application March 8, 1935, Serial No. 10,013

3 Claims. (Cl. 219—35)

This invention relates in general to ovens and has more particular reference to a small size electrically heated oven for baking various kinds of foodstuffs, such as sandwiches, sausages, and the like.

A principal object of the invention is the provision in an oven of this character of a well insulated baking compartment and a tray or container for the material to be cooked, which may be inserted therein and have the additional function of a closure member for the baking compartment.

Another important object of the invention is the provision of means for draining surplus grease and the like from the tray part of such an oven through the closure part thereof into a suitable receiver outside the oven.

A further important object of the invention is the provision of a small, compact, electrically heated oven which is easy and simple of manufacture.

Numerous other objects and advantages of the invention will be apparent as it is better understood from the following description, which, taken in connection with the accompanying drawing, discloses a preferred embodiment thereof.

Figure 1:
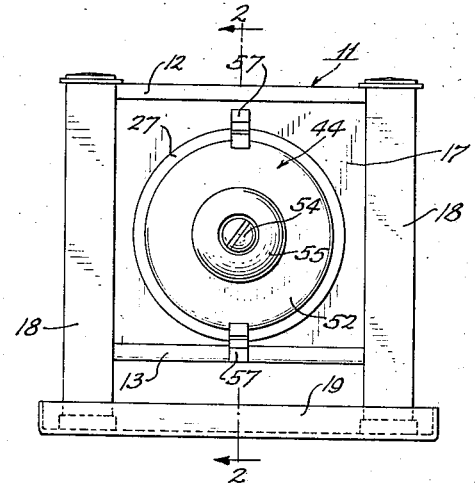
Figure 1 is a front end elevation of an oven embodying my invention.
Figure 2:
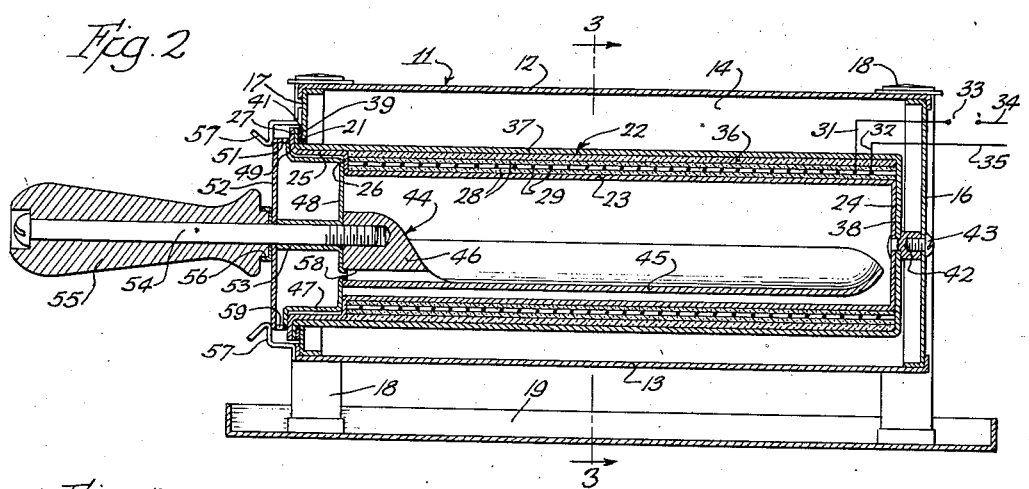
Fig. 2 is a longitudinal vertical section taken substantially on the line 2—2 of Fig. 1.
Figure 3:
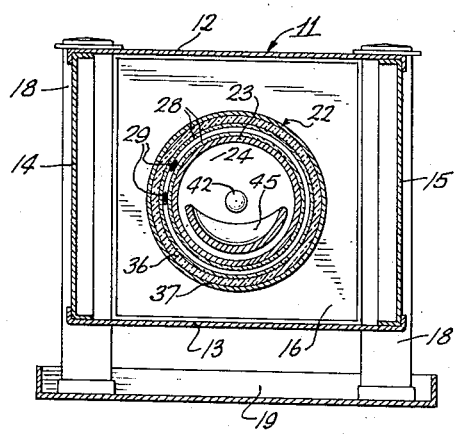
Fig. 3 is a vertical sectional view taken substantially on the line 3—3 of Fig. 2.

Referring more particularly to the drawing, reference numeral 11 indicates generally an external casing or body member, comprising upper and lower wall members 12 and 13, side walls 14 and 15, and rear and front walls 16 and 17, respectively, which are preferably stamped or pressed from any desired light, strong material and provided with suitable marginal flanges which may be welded or otherwise rigidly secured to the adjacent wall members and to supporting members or posts 18 so that the casing 11 is maintained at a suitable distance from the supporting surface upon which it rests. A tray 19, stamped or otherwise formed from any suitable or preferred material, is or may be positioned beneath the casing 11 as a protecting means for the surface upon which the device is supported.

The front wall 17 of the casing 11 is provided with a central circular opening 21 within which the front end of a baking compartment, indicated generally at 22, is supported. The baking compartment 22 is made as a unitary assembly comprising an inner hollow cylindrical wall member 23, stamped or otherwise formed from any suitable material, which is closed at 24 at its rear end and has an enlarged portion 25 joined to the main body portion 23 by a shoulder 26 adjacent its forward end and which portion 25 terminates in a vertically disposed annular flange 27.

In the manufacture of the baking compartment 22, the inner wall member 23 is first coated or covered on its outer surface with a layer of any suitable insulating and non-conducting material 28, mica or an insulating cement such as "Insulute" being preferred. Over this layer of non-conducting material is wound an electrical resistance or heating coil 29, of well-known construction, preferably in the form of a double helix so that the two ends 31 and 32 are at one end. These ends 31 and 32 of the heating element are or may be extended to the exterior of the casing 11 and connected, in the usual manner through a manually operable switch 33 of any desired construction and located in any convenient position, to main lines 34 and 35. The heating element 29 is then covered by and embedded in another layer of non-conducting material 28, over which may be placed an additional layer of insulating material 36, such as asbestos, of sufficient thickness to make the outer diameter thereof equivalent to that of the enlarged portion 25 of the member 23.

This structure is then inserted in an outer hollow cylindrical wall member 37 closed at 38 at its rear end and having a vertically disposed annular flange 39 at its forward end which is welded or otherwise secured to the flange 27 of the inner wall member 23 to complete the baking compartment 22.

An annular ring or washer 41, of any suitable heat insulating material, is inserted between the front wall 17 of the casing 11 and the flange 39 of the baking compartment 22.

To maintain the baking compartment 22 firmly in place, a spacer member 42 is rigidly secured in any desired manner, as by riveting, to the rear wall members 38 and 24 and is also secured to the rear wall 16 of the casing 11 by a screw 43, or suitable fastening means. In this manner the baking compartment 22 is completely insulated from the casing 11. While the compartment 22 is shown as cylindrical, it will be readily apparent that it may be made in any other desired shape.

A tray or container for the material to be cooked, indicated generally at 44, is adapted to be removably insertable into the baking compartment 22, and comprises a tray or supporting member 45 of any desired shape having a solid portion 46 at its forward end. Adjacent this solid portion 46 and secured thereto in a manner to be later described is an insulating and closure member comprising a hollow cylindrical member 47, stamped or otherwise formed from any suitable material, which is closed at its rear end by a wall 48 integral therewith and terminates at its forward end in a vertically disposed annular flange 49 to which is secured in any desired manner, as by welding, a horizontal annular flange 51 of a circular plate 52, the resulting structure being adapted to fit complementally within the enlarged portion 25 of the inner wall 23 of the baking compartment 22.

A tubular spacing member 53 is positioned between the plate 52 and wall 48 through which is adapted to extend a tie rod or bolt 54 which connects a handle 55 having the usual guard member 56, the closure members 47, 52, and the tray 45 together by being screwed into a suitably threaded recess in the solid portion 46 of the latter to form a unitary assembly 44.

A pair of spring clips 57 may be secured in any desired manner to the front wall 17 of the casing 11 adjacent the opening 21 to yieldably hold the tray unit 44 in cooking position by engaging the plate 52. A passage 58 is or may be provided through the wall member 48 and the bottom part of the solid portion 46 flush with the bottom of the trap 45, and an aperture 59 may also be provided in the flange 51 at the bottom thereof so that any excess grease, and so forth, may drain therethrough from the tray 45 to the tray 19.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an oven having an outer casing and an inner cooking compartment having one end open; a tray removably insertable into said compartment, comprising a supporting member for the material to be cooked, a hollow substantially cylindrical-shaped closure member for the open end of said compartment, a handle, and means for securing said handle, closure member and supporting member together, said supporting and closure members having interconnecting passageways for draining any undesired liquid accumulated in said tray during a cooking operation to the exterior of the oven.

2. In an oven having an outer casing, and an inner cooking compartment having one end open; a tray removably insertable into said compartment, comprising a supporting member for the material to be cooked, a hollow closure member for the open end of said compartment having an aperture in the inner and outer walls thereof, respectively, a handle, and means for securing said handle, closure member and supporting member together, said supporting member having a passageway therethrough connecting with the aperture in the inner wall of said closure member for draining any undesired liquid accumulated in said tray during a cooking operation into said hollow closure member, said aperture in the outer wall of said closure member permitting the drainage of such liquid to the exterior of the oven.

3. In an oven having a supporting tray, an outer casing, and an inner cooking compartment having one end open; a second tray removably insertable into said compartment, comprising a supporting member for the material to be cooked, a hollow, substantially cylindrically-shaped closure member for the open end of said compartment, a handle, and a bolt for securing said handle, closure member and supporting member together, said supporting and closure members having interconnecting passageways for draining any undesired liquid accumulated in said second tray during a cooking operation from said second tray into said supporting tray.

WILLIAM L. O'NEILL.